Oct. 25, 1949.   C. O. J. MONTELIUS   2,486,193
SPIRAL GEARING
Filed April 30, 1946                                 2 Sheets-Sheet 1
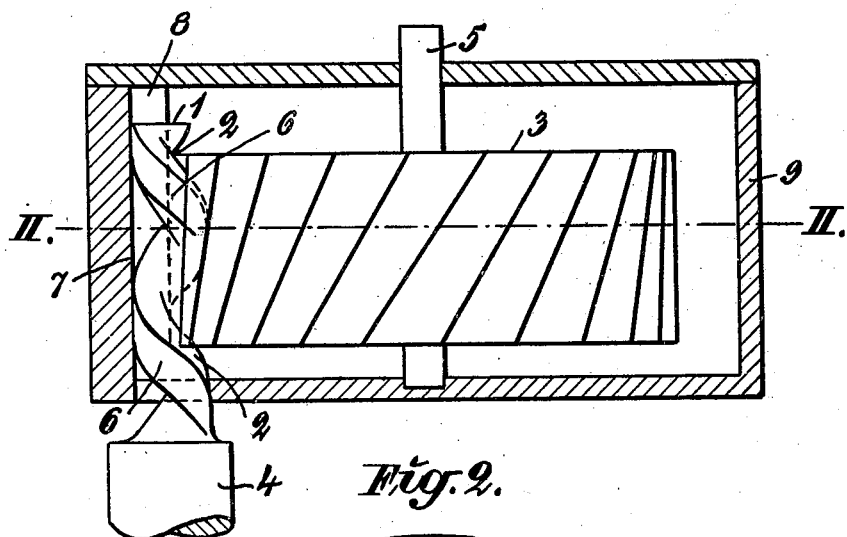
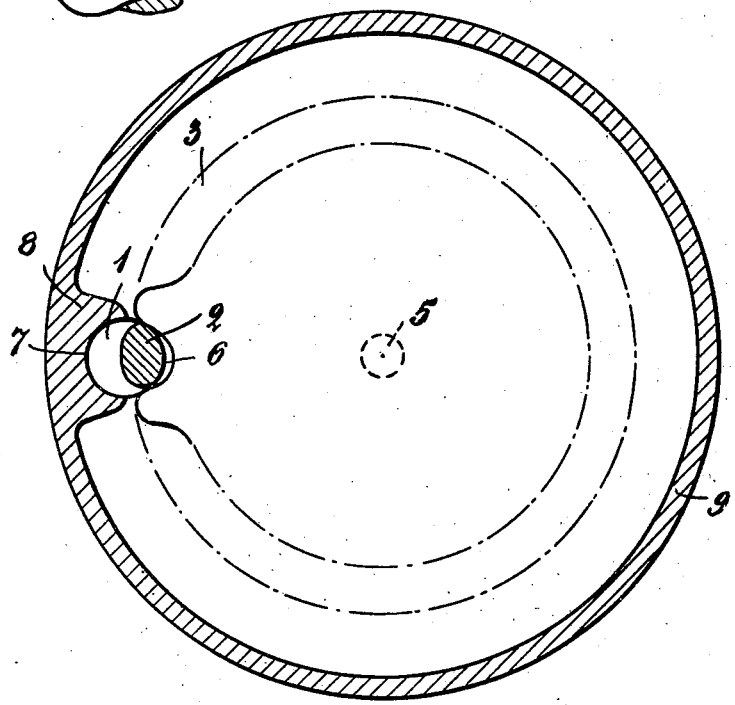
Inventor
Carl Oscar Josef Montelius
by Stevens and Davis
his attorneys

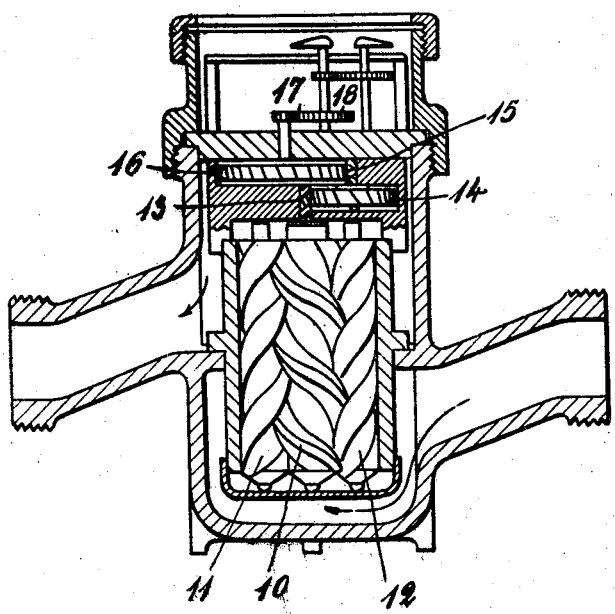

Patented Oct. 25, 1949

2,486,193

UNITED STATES PATENT OFFICE 2,486,193

SPIRAL GEARING

Carl Oscar Josef Montelius, Stockholm, Sweden

Application April 30, 1946, Serial No. 666,088
In Sweden June 8, 1945

3 Claims. (Cl. 74—424.5)

In gears with ordinary cylindrical gear wheels the number of wheels at high gear ratios will be great, due to the fact that the number of teeth in a straight cylindrical pinion cannot suitably be decreased under a certain value. The use of ordinary screw gears is also in many cases unsuitable, as such gears require an increased space because of the fact that the shafts are at right angles to each other.

The present invention relates to a spiral gearing, which consists of a single-tooth spiral cut gear wheel engaging with a multiple-tooth spiral cut gear wheel, the shaft of which is parallel to the shaft of the first-mentioned gear wheel. The invention is principally characterized thereby that the material in the single-tooth gear wheel is cut away unto or adjacent to the axis of said gear wheel, so that the gear wheel substantially consists only of the spiral cut tooth.

By this means a sufficient depth of tooth is attained at a certain given module of the multiple-tooth gear wheel. The spiral cut tooth thus forms a screw-thread, the shaft of which is parallel with the shaft of the multiple-tooth gear wheel. For obtaining a smooth continuous operation the pitch of said thread should be less than the width of the multiple-tooth gear wheel so that the single-tooth gear engages the next tooth of the multiple-tooth gear wheel before its engagement of the preceding tooth has ceased.

The stability of the single-tooth gear wheel is low for the reason that most of its material is cut away, and it would stand only small load, if it were journalled in the ordinary way.

According to the invention this problem is solved by journalling the single-tooth gear wheel against a bearing surface placed along its outside on the opposite side of said gear wheel in relation to the multiple tooth gear wheel. The outer face of the spiral cut tooth should be formed to fit this bearing surface. The length of the bearing surface is preferably made greater than the width of the multiple-tooth gear wheel, whereby a safe bearing for the single-tooth gear wheel is attained.

A simple way to manufacture the single-tooth spiral gear wheel is first to shape a rod or wire to a suitable cross-section and then to wind it to a spiral with the desired lead and diameter, suitable to cooperate with a spiral-cut multiple-tooth gear wheel.

An embodiment of the invention is illustrated on the enclosed drawing.

Fig. 1 shows a side elevational view of a toothed gearing according to the invention and Fig. 2 a plane view of same, partly in section along the line II—II in Fig. 1.

Fig. 3 shows a longitudinal section through a water measuring device of special type, in which toothed gearings according to the present invention may be used.

The toothed gearing, illustrated in Figs. 1 and 2, consists of a single-tooth gear wheel 1 having only one spiral cut tooth 2, which is in engagement with the multiple-tooth spiral cut gear wheel 3.

The shafts 4 and 5 respectively of the gear wheels are parallel with each other. As can be seen from the drawing, the material on the sides of the spiral cut tooth 2 is cut away unto or adjacent to the axis of the gear wheel 1, so that this gear wheel substantially consists only of the spiral cut tooth 2 formed as a thread. As to be seen from Fig. 1, both the width of the multiple-tooth gear wheel and the length of the single-thread is greater than the lead of the single-tooth wheel, in order to attain an even, continuous transmission of motion, as mentioned above.

The outer face 6 of the tooth 2 may, in the embodiment shown, suitably be formed to a cylindrical surface, the axis of which coincides with the axis of the gear wheel 1. The gear wheel 1 is journalled against side pressure from the gear wheel 3 by means of a part-cylindrical bearing surface 7 arranged on the opposite side of the gear wheel 1 in relation to the gear wheel 3, said bearing surface having the same shape as the outer surface 6 of the tooth 2, which surface supports against and slides along the bearing surface 7.

The bearing surface 7 is for instance formed in a fillet 8 provided along the wall of the casing 9, which fillet is so long that the length of the bearing surface 7 will be greater than the width of the gear wheel 3, whereby an effective journalling of the gear wheel against the side pressure is ensured. Against axial pressure in one direction or other the gear wheel 1 may be journalled in the usual manner, if required.

The measuring apparatus shown in Fig. 3, which for instance may be a water meter, is of the type, in which the fluid drives a screw motor, which consists of at least two (in this case three) rotatable rotors provided with screw threads engaging with each other, of which one rotor 10 is provided with thread-cams with convex faces, while the other rotors 11 and 12 are provided with thread-cams with corresponding concave faces.

The rotors 11 and 12 are freely turnable, and the rotation, which is produced by the fluid passing through the meter, is transferred from the rotor 10 to the index devices by means of a gearing with very great gear ratio.

The single-tooth spiral cut gear wheel 13 of the first toothed gearing is mounted on the shaft of the rotor 10 and engages with the multiple-tooth spiral cut gear wheel 14 on the shaft of which a second single-tooth spiral cut gear wheel 15 is mounted, which engages with a second multiple tooth spiral cut gear wheel 16. Other shown gear wheels 17, 18 are ordinary straight cylindrical gearings.

Now the gear ratio of every pair of spiral-cut wheels, one of which having only a single tooth, is very high or equal to the number of teeth of the cooperating multiple-tooth wheel. Therefore in this case only two pairs of gear wheels give the same total gear ratio, which would otherwise require five or six pairs of gear wheels of the ordinary type.

The invention is of special importance in fluid meters, where the speed of the driving device is very high. In hitherto used devices it is often observed that in spite of the fact that the frictional resistance of the registering mechanism is insignificant, the first wheel in the gearing, which is driven by the pinion of the driving device is worn much more than the other more slowly running wheels. The reason for this is that this wheel, which runs at high speed submerged in fluid, produces a high whirl resistance. In an apparatus according to the present invention the speed of the first gear wheel is decreased to a minimum, whereby the whirl resistance and thereby the wear of the teeth is reduced to the lowest possible extent.

Having now particularly described the nature of my invention and the manner of its operation what I claim is:

1. In a gearing, a spiral-cut multiple-tooth gear wheel, a cylindrical spiral-cut gear wheel having one single tooth and engaging said multiple-tooth gear wheel, the axis of rotation of said two gear wheels being parallel, the material of said single-tooth gear wheel being cut away in such a manner that it substantially consists of only the spiral cut tooth, the length of said single tooth gear wheel and the width of said multiple-tooth gear wheel, both being greater than the lead of said single-tooth gear wheel, a peripheral bearing surface, half-circular in cross-section being arranged along the outside of said single-tooth gear wheel and on the opposite side of said single tooth gear wheel in relation to said mutliple-tooth gear wheel, the outside of said single-tooth gear wheel engaging said bearing surface.

2. In a gearing wherein the axes of the gear wheels are parallel, a spiral-cut multiple-tooth gear wheel, a spiral-cut single-tooth gear wheel engaging said multiple-tooth gear wheel, the root diameter of said spiral-cut single-tooth gear wheel being substantially zero, the length of said single-tooth gear wheel and the width of said multiple-tooth gear wheel being each greater than the lead of said single-tooth gear wheel, and a peripheral, semi-cylindrical bearing surface parallel to the axis of said single-tooth gear wheel, said bearing surface lying adjacent to and in bearing relation with that section of the crest of said single-tooth gear wheel which is free of engagement with said multiple-tooth gear wheel, said bearing surface supporting said single-tooth gear wheel in engagement with and against the lateral thrust of said multiple-tooth gear wheel.

3. In a gearing wherein the axes of the gears are parallel, a spiral-cut multiple-tooth gear, a spiral-cut single-tooth gear engaging said multiple-tooth gear, at least one end of said single-tooth gear being free of axial journalling, the root diameter of said spiral-cut single-tooth gear wheel being substantially zero, the length of said single-tooth gear wheel and the width of said multiple-tooth gear wheel being each greater than the lead of said single-tooth gear wheel, and a peripheral, semi-cylindrical bearing surface parallel to the axis of said single-tooth gear, said bearing surface lying adjacent to and in bearing relation with said single-tooth gear and supporting said single-tooth gear in engagement with and against the lateral thrust of said multiple-tooth gear.

CARL OSCAR JOSEF MONTELIUS.

REFERENCES CITED

The following references are of record in the file of this patent:

UNITED STATES PATENTS

| Number | Name | Date |
|---|---|---|
| 17,516 | Ramsden | June 9, 1857 |
| 18,093 | Haviland | Sept. 1, 1857 |
| 74,337 | Gallagher | Feb. 11, 1868 |
| 327,349 | Taylor | Sept. 29, 1885 |
| 480,724 | Hicks | Aug. 16, 1892 |
| 676,641 | Venn | June 18, 1901 |
| 1,511,049 | Cederquist | Oct. 7, 1924 |
| 1,753,825 | Ford | Apr. 8, 1930 |
| 2,173,660 | Perkins | Sept. 19, 1939 |
| 2,174,814 | Ackerman | Oct. 3, 1939 |
| 2,348,734 | Freeman | May 16, 1944 |

FOREIGN PATENTS

| Number | Country | Date |
|---|---|---|
| 140,223 | Great Britain | Mar. 25, 1920 |